United States Patent
Hurley et al.

(10) Patent No.: US 7,403,854 B1
(45) Date of Patent: Jul. 22, 2008

(54) METHOD AND APPARATUS FOR DETERMINING WIND FARM ELECTRICITY PRODUCTION

(75) Inventors: Brian Hurley, Skerries (IE); Ciaran King, Marino (IE)

(73) Assignee: Airtricity Holdings Limited, Glasthule, County Dublin (IE)

( * ) Notice: Subject to any disclaimer, the term of this patent is extended or adjusted under 35 U.S.C. 154(b) by 0 days.

(21) Appl. No.: 11/741,501

(22) Filed: Apr. 27, 2007

(51) Int. Cl.
*G05D 3/12* (2006.01)
(52) U.S. Cl. .................... 702/3; 700/291; 700/286; 705/412; 290/44; 290/55
(58) Field of Classification Search ............... 702/1–3; 700/291, 286, 297; 290/44, 55; 705/412
See application file for complete search history.

(56) References Cited

U.S. PATENT DOCUMENTS 6,512,966 B2 *  1/2003  Lof et al. .................... 700/291

FOREIGN PATENT DOCUMENTS

WO    WO 02/054561    7/2002

* cited by examiner

*Primary Examiner*—John E Barlow, Jr.
*Assistant Examiner*—Sujoy K Kundu
(74) *Attorney, Agent, or Firm*—James P. Muraff; Neal, Gerber & Eisenberg, LLP

(57) ABSTRACT

A method and apparatus for providing wind farm electricity production values is described. Such an arrangement is useful in providing an indication of potential electricity production values from a test site where there is limited meteorological data available. By associating the test site with a reference site for which there is extended data available, it is possible to utilize the data from the reference site to provide an estimate of future wind conditions and hence the potential wind resource that can be utilized in the production of electricity from that site.

15 Claims, 4 Drawing Sheets

METHOD AND APPARATUS FOR DETERMINING WIND FARM ELECTRICITY PRODUCTION

FIELD OF THE INVENTION

The present invention relates to wind farms and in particular to an apparatus and methodology for determining the potential electricity production available from a wind farm.

BACKGROUND

When choosing a specific geographic site for locating a wind farm it is important that the meteorological conditions at that site will suit the location of wind turbines there must be a wind resource of suitable quality to ensure that the located farm will provide a reasonable output. It is not sufficient that the site is exposed to wind, it is also useful that that wind is reasonably predictable. Unfortunately the information on the historical wind resource is not always available and there is therefore a need to use limited monitoring of the resource as an indicator of the potential future behavior.

One solution to this is to compare the short term measured meteorological data from the site with that of a regional meteorological station for which longer term data is available. As part of this approach the longer term data that is available from the meteorological station is used to effect a prediction of the output that may be expected from the wind farm site.

The difficulties associated with combining data sets from different locations within a region is that there is a possibility that the predicted output from the wind farm may be biased either to a low or a high value.

There is therefore a need to provide a methodology for predicting the future wind resource for a particular site that represents an accurate reflection of the expected conditions at that site.

SUMMARY

These and other problems are addressed by a system and methodology which in accordance with the teaching of the invention provides for a combination of measured data from a test site with that from a reference site which has longer term data so as to provide a determination of the potential power production from the test site. As part of the teaching of the invention each of the reference and test sites are sub-divided into direction sectors, the measurements within those sectors are then sorted and a correlation is effected between sorted data provided within test and reference sectors, the correlation providing a relationship between wind speed frequencies. Once a relationship is determined it is possible to use that relationship, in combination with historical data from the reference site to determine future wind conditions at the test site. These wind conditions are then useable in a determination of the potential energy output from a wind farm located at that site.

Other systems, methods, features, and advantages of the present invention will be, or will become, apparent to one having ordinary skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The present invention will now be described with reference to the accompanying drawings in which.

DETAILED DESCRIPTION OF THE DRAWINGS

The invention will now be described with reference to exemplary embodiments which are provided to assist in an understanding of the teaching of the invention but it will be understood that the invention is not to be construed as being limited in any fashion to these exemplary embodiments.

Figure 1:
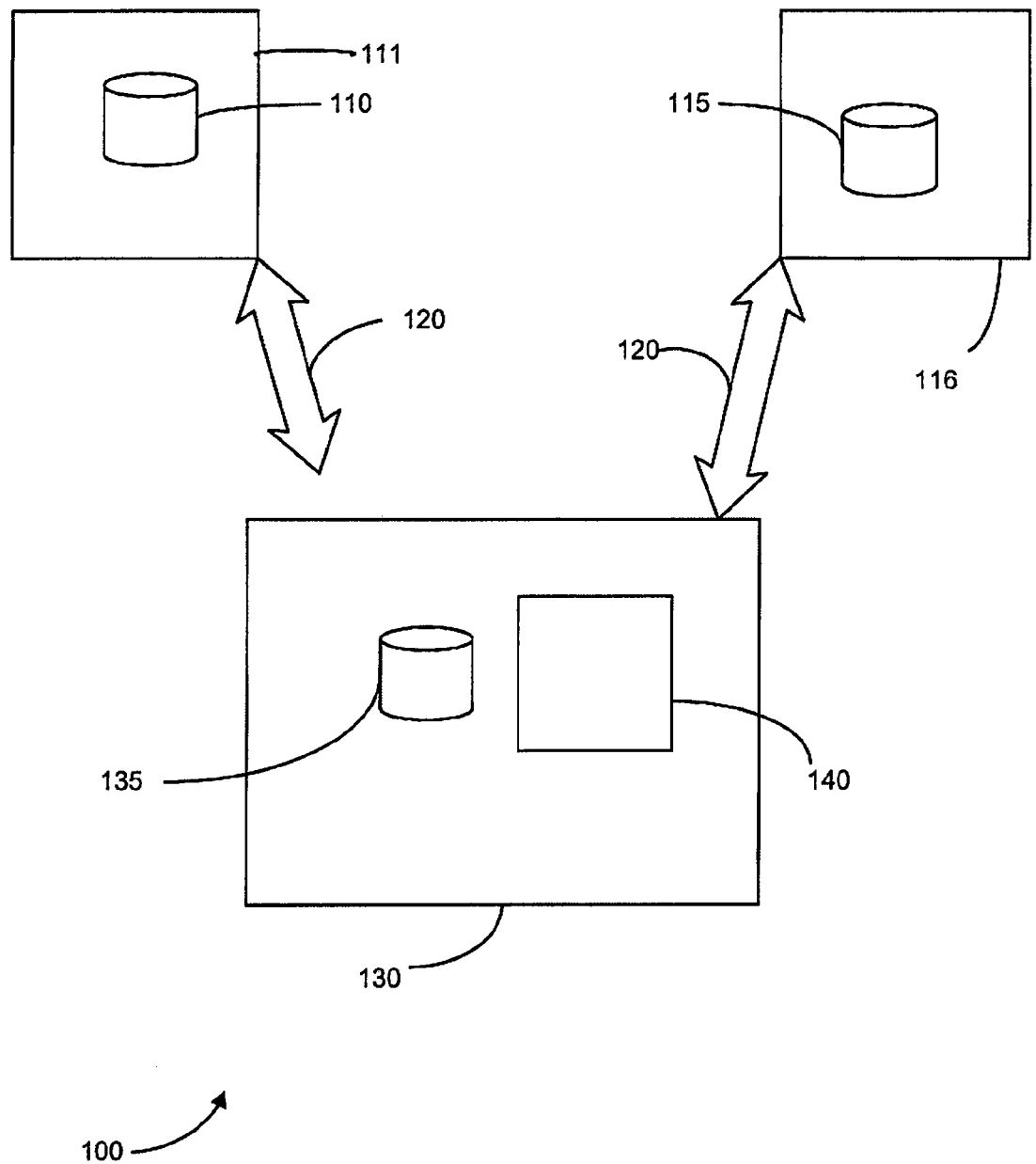
FIG. 1 is a graphical representation of a system architecture in accordance with the teaching of the invention.

FIG. 1 is a graphical representation of a computer architecture that may be useful in implementing the teaching of the invention. Such an architecture 100 includes a first datastore 110 configured to store data representative of meteorological conditions at a reference site 111 and a second data store 115 configured to store data representative of meteorological conditions at a test site 116. Typically the information stored within the first data store will be representative of a greater or longer time duration than that for the second data store. Each of the reference and test sites are geographically remote from one another and their respective data stores could either be co-located at their sites or could be provided with a communication path to enable the transfer of data recorded at that site to a remotely located data store. While geographically remote it is useful for the two sites to be within a defined weather region, such that wind conditions experienced at a first site could be expected to also be experienced at the second site. The communication path that provides access to the data collected at each of the two sites could be over a fixed or wireless communication network as will be appreciated by those skilled in the art. In the arrangement of FIG. 1, the data stores are shown co-located with their geographical site, but are in communication with a central server 130 through communication paths 120. It will be understood that the communication paths 120 are representative of an interaction with data collected at each of the test and reference sites and that the actual data could be stored, particularly in the case of the reference site, could be stored at and interfaced through a third party provider. Such a latter scenario is typical where for example the reference site is a meteorological station where the data that is collected at that station is then stored remotely from the station with data from a plurality of other stations. It will also be understood that the data collected from a single reference site may be useful in determining estimated power outputs from a number of different test sites.

The central server desirably includes a central data store 135 which is configured to store data from each of the first and second data stores. Such centralized storage facilitates the processing of the data by a processor 140. It will however be understood that the processor could be provided with a direct feed to each of the first and second data stores, obviating the need for the storage of the data centrally.

The processor is configured to effect a correlation between the data representative of conditions at the reference site with that representative of conditions at the test site. By providing a correlation with data collected concurrently, it is then possible to use the larger data set that is provided by the reference site to extrapolate the data set collected at the test site for longer time periods. This technique is useful for leveraging off the data that could have been collected at a meteorological station for many years, when one wants to estimate wind conditions for a test site where one only has a number of months of collected data. In accordance with the teaching of the invention such a correlation of wind speeds involves effecting an algorithmic relationship between the two sets of data. This may be considered graphically as fitting a line with a non-zero intercept (i.e. of the form 'y=mx+b') to a chart of test site against reference site speed data. The line fitting involves independent sorting of reference and test site speeds, hence the fitted line estimates the relation between wind speed frequency distributions rather than hourly values. In fact, full sorting of speeds is not essential, but sorting is described below for the purpose of explaining the method.

Figure 2:
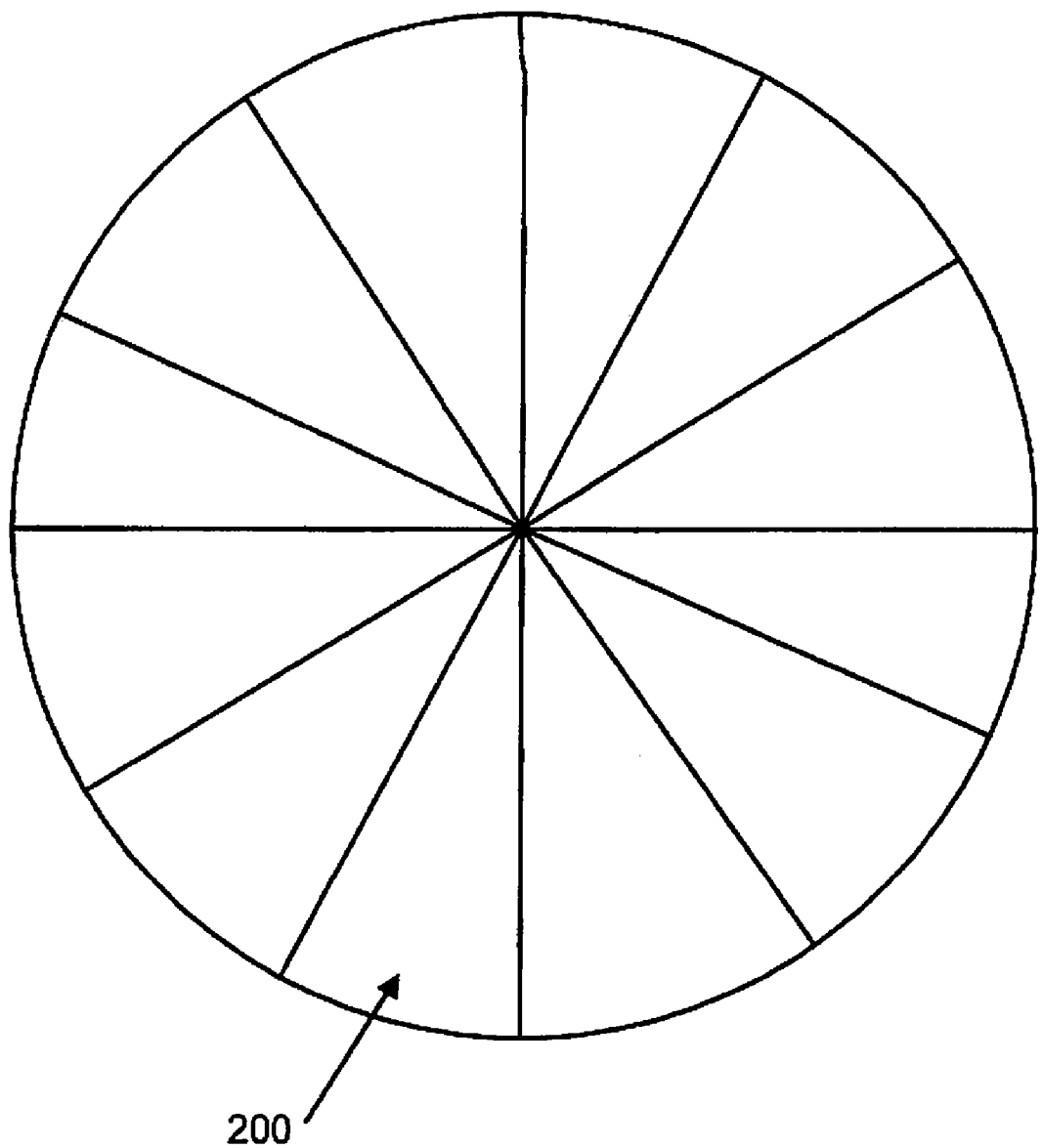
FIG. 2 is an example of the sectoring approach that may be implemented within the teaching of the invention.

In accordance with conventional data collection techniques wind monitoring equipment such as anemometers, wind vanes, wind socks and the like can be used locally at each of the measurements sites to collect data representative of the wind conditions at that site. Each data store will therefore have a number of data sets for specific time intervals including data representative of the wind direction and speed at a specific time. Within each data store, the data is desirably sorted into sectors representative of the direction of the wind recorded. An example of such a sector 200 is shown in FIG. 2, where it will be understood that the wind direction at a particular site may be sourced from any one direction within a 360° direction span. For the sake of computational ease, it is desirable to combine the directions into extended ranges, in this case the full $2\pi$ range is divided into 12 equal sectors of 30° each.

Figure 3:
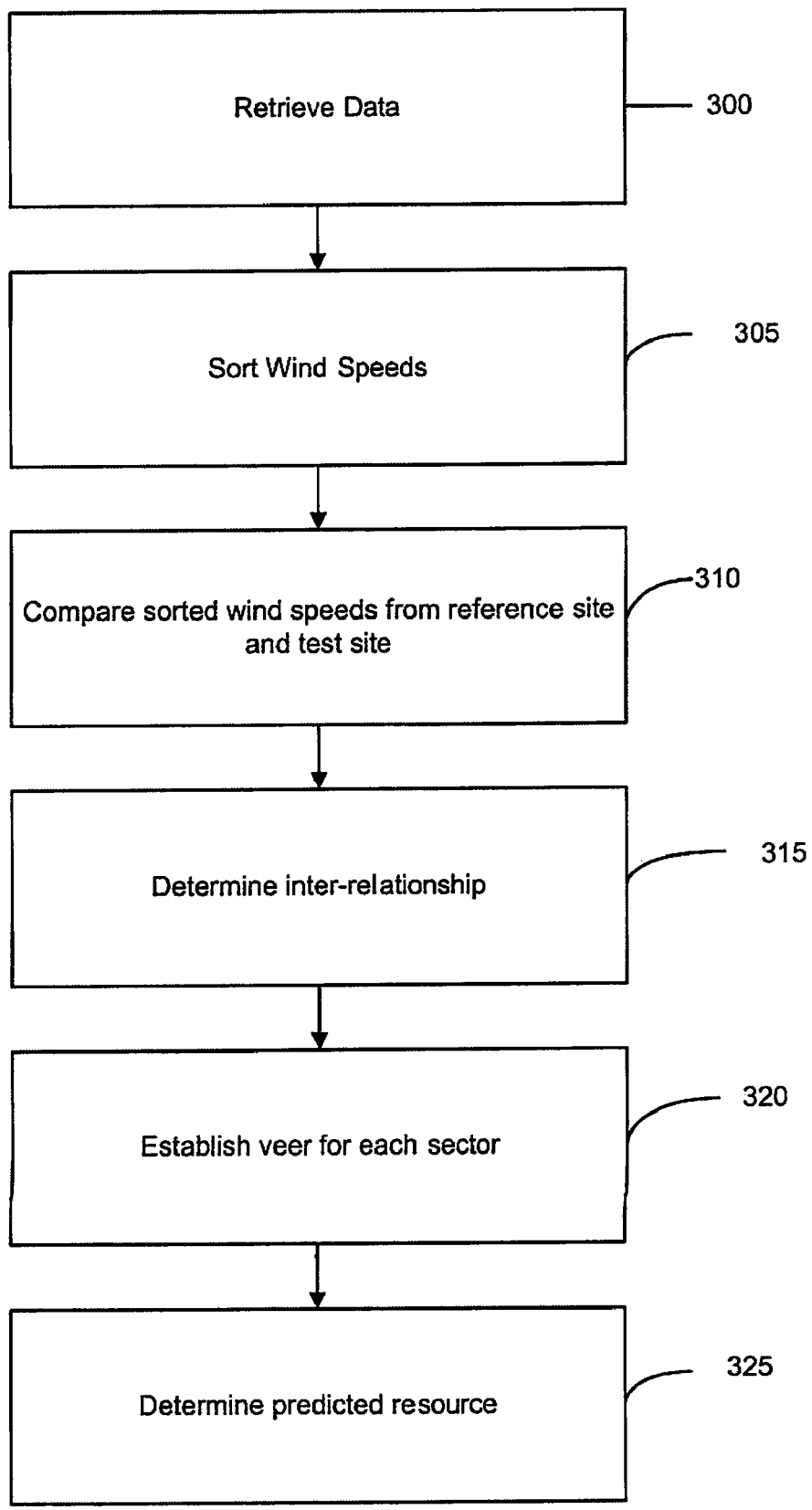
FIG. 3 is a methodology that may be implemented as part of the teaching of the invention.

As shown in FIG. 3, the teaching of the invention involves a number of steps. Firstly, it is necessary to retrieve the data from each of the test and reference sites (Step 300). This data is desirably collected at each of the test and reference sites for the same time period and at the same intervals. Desirably at least one year's concurrent data is recorded. The retrieved data may then be sorted into sectors, typically one of 12 available sectors, on the basis of the reference site direction. It will be understood that such a sorting will result in each sector having a number of data sets, each data set having at least a time of recordal of that data set and a wind speed at that time.

At this juncture in the process, it is desirable that the recorded data sets are not filtered—all speeds are included. Records with zero windspeed at the reference site are allocated randomly among sectors.

Once allocated within a specific sector, the wind speed component of each data set is then separated from its recordal time. In this way, each sector in each of the reference and test site data sets will have a plurality of wind speeds. According to the teaching of the invention, once these speeds are identifiable they are then sorted in a comparable order, be that ascending or descending. In this manner each sector of each of the test and reference sites will have a data set where reference and test site speeds are independently sorted in a comparable order—be that ascending or descending (Step 305). Sorted test site speeds are plotted against sorted reference site speeds, to provide a comparison between the two sites (Step 310). It will be understood that by sorting speeds against speeds that it is quite probable that a speed recorded at a particular time at the reference site will not be compared with a speed recorded at the same time at the test site. In this way the present invention provides a relationship between wind speed distributions as opposed to wind speed times. The inter-relationship between the two data sets may be expressed graphically by plotting points that follow a curve which extends from at or near the origin towards the high-windspeed region of the chart, see for example FIG. 4. As is evident from an examination of FIG. 4, by using a sort based on speeds, there is less scatter between the two data sets and as a result it is possible to provide a more accurate correlation between the two data sets. It will be appreciated that that graphical expression of the relationship as provided by FIG. 4 simply assists in understanding of the relationship and that such graphical representation is not a requisite in performance of the teaching of the invention.

Once the two data sets are in a suitable fashion for comparison it is necessary to then effect a determination of the relationship between the two. It is desirable that this relationship be determined for all speeds above a minimum cut-off speed as determined with reference to the reference site. The cut-off speed is determined with regard to the reference site as this is the set of data that is used for the extrapolation purposes. This cut-off speed is provided as below a certain speed wind turbines do not perform optimally. By using a cut-off that is representative of the operation of the wind turbines it is possible to provide a relationship that is representative of the power curve of operation of the turbines that will be operable in the test site. Turbines typically have an optimized performance or power output in wind conditions ranging between 4 $ms^{-1}$ and 25 $ms^{-1}$. By removing those winds below the lower cut-off point it is possible to reduce the possibility that the winds detected were locally generated, and also reduce the possibility of noise corrupting the data measurements. In certain scenarios, a strict cut-off at a specific speed would reduce the number of data points below a statistically significant value. This can be catered for in accordance with the teaching of the invention by using a dynamic cut-off which is related to the number of points collected.

In order to form such a dynamic cut-off value, a reference site cut-off speed (refCutoff) may be calculated as follows.

$$refCutoff = (lowSpeedThreshold + (refMean/2))/2$$

where refMean=is the reference site long-term mean windspeed [m/s].

LowSpeedThreshold=4 m/s

Figure 4:
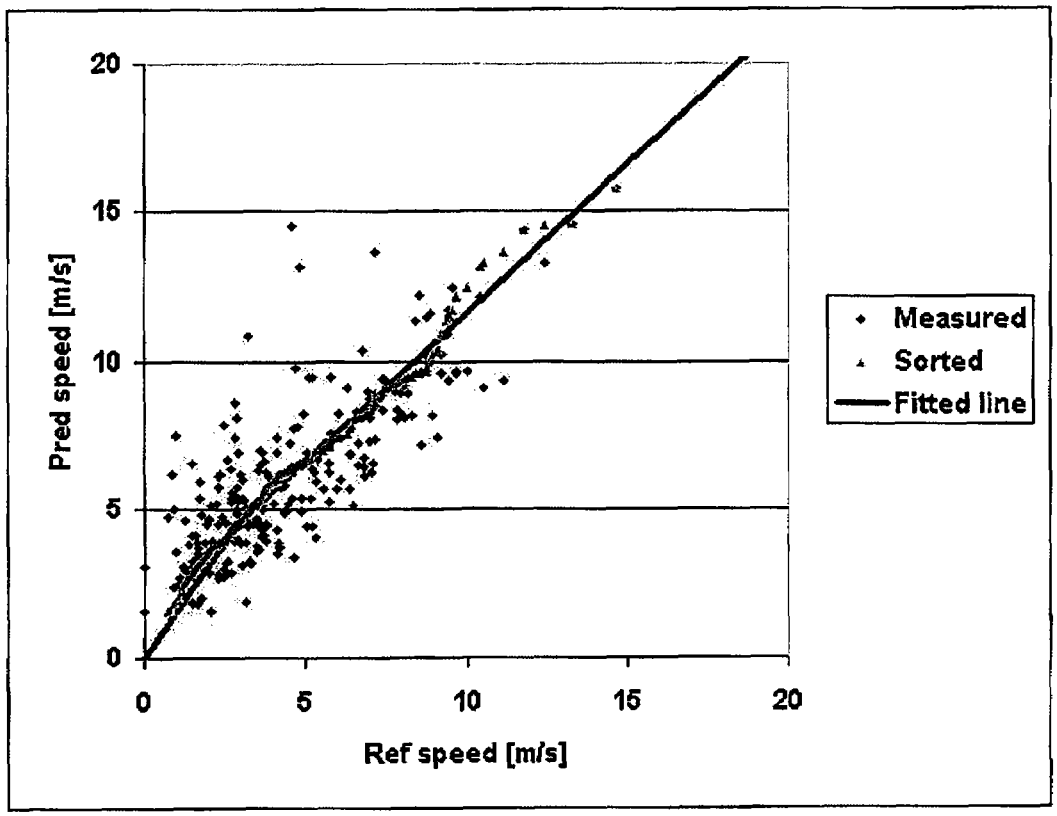
FIG. 4 is a graphical example of the inter-relationship between reference and test data for use in providing an estimate of an available wind resource.

A line of the form 'y=mx+b' fitted to that part of the curve above the reference site cut-off speed may then be determined (Step 315). The line-fitting method is described below. Below the cut-off speed, the line is taken straight back to the origin. An example of the result for one sector is illustrated in FIG. 4 which shows an example of one sector's measured hourly data, with sorted data and fitted line superimposed. For the fitted line, slope=0.99, intercept=1.67. Below the reference site cut-off speed (here 2.90 m/s) the fitted line is taken straight back to the origin. It will be understood that the provision of a cut-off value based on the reference site data sets will result in a number of data points being excluded from the reference site data set. To ensure that a direct correlation is possible, the same number of data points are then deleted from the test site data set. In this way if the generation of a cut-off value resulted in 10 values being excluded from the reference site, then the 10 lowest values in the sorted test site would also be excluded.

Using this reduced set of data points from each of the test and reference sites it is then possible to provide a relationship between the two sets of data, and to use that relationship to extrapolate the data collected from the test site for future time periods. This first transformation of speeds values addresses the problem of predicting speeds values for the wind in the test site.

It is then often necessary to provide a prediction of wind directions for the wind in the test site. This may be effected using a wind veer transformation. Wind veer is representative of the offset between directions at the two sites and is a difference between test and reference site directions for a given time period, expressed in the range −180 to +180 deg, and considered positive when test site direction is clockwise of reference site direction. The average veer for a sector is simply the average of all hourly veer values in that sector.

As an example of a veer measurement, consider a wind measurement at a particular time that was measured at 270° at the reference site. A corresponding measurement at the test site may be affected by physical geographic features at the test site and be measured at 275°, a veer between the two sites of 5°. By providing an average veer measurement it is possible to determine an appropriate allocation of each wind speed to an appropriate sector (Step 320).

As was mentioned above, the raw data from each of the test and reference sites will include data on wind speed and wind direction. In order to provide a veer analysis, the data sets for the veer analysis are filtered to exclude records having a windspeed at either site below its cut-off. The cut-off speeds used for this part are normally between 4 and 5 m/s, i.e. the normal lower cut-off speed for a wind turbine. The provision of a dynamic cut-off for calculation of wind veer is not as important as it is for wind speed.

The remaining data are sectorized on the basis of reference site direction, and the average 'veer' in each sector is calculated. The average veer is calculated with regard to the midpoint of each sector, and then linear interpolation techniques are used to provide an appropriate veer value for each data set point.

The sectoral windspeed ratios and veers are then applied to the long-term reference site data to produce a long-term frequency table for the test site (Step 325). This frequency table gives an indication of how frequently a wind measurement in a particular range in a particular sector at a particular time is determined.

In applying the sectoral ratios and veers, they are taken to apply at the mid-point of the sector, with linear interpolation used between mid-points. Such an interpolation technique is advantageous as it caters for variances that are at the borders between adjacent sectors. This technique may be used to give better results than applying the average ratios and veers to all points in a sector.

It will be appreciated that by ranking the data from two different geographic locations and then correlating that data that it is possible to interpolate the data from a limited time period at a test site to effect a prediction of the wind resource that may be expected at that site in the future, this having been normalized based on long term records. Once the information as to future meteorological conditions is known, it is possible to use that information together with information from operating criteria of wind turbines to effect a determination of the potential output from that test site.

It will be understood that the defined relationship between the sorted speed data, or a smoothed version of it, could itself be used as the relation between speeds at the two sites (for a given sector). Indeed, with a lot of data and good directional correlation, this would be the best method, accurately mapping the different windspeed frequency distributions at the two sites. In accordance with the teaching of the invention it is found that in an application of the methodology applied to relative short correlation periods that use of straight-line fits above the cut-off point provides a useful measurement for extrapolating the data originating at the test site.

It is possible to effect the inter-relationship between the two data sets in a number of different ways including one or more line fitting techniques. Such line-fitting may be effected by means of orthogonal regression. However, it has been found that a particular effective technique that may be implemented in a computationally efficient fashion is one that follows the following steps and does not require full sorting of speed data.

1. For the reference site, for a given sector, speeds below the cut-off are excluded. The number of speed values excluded is determined; let us call this number X.
2. Of the remaining speeds, the mean of the top 50% of speed values, and that of the bottom 50%, are determined. The number of values in each 50% is determined; let us call these values Y1 and Y2 (Y1 will either equal Y2, or differ from it by 1).
3. For the test site, the lowest X speeds, as determined with reference to the number of speeds excluded from the data of the reference site, are excluded, and the mean of the top 50% and bottom 50% of the remainder (containing Y1 and Y2 values respectively) are determined.
4. On a chart of prediction site speeds against reference site speeds for this sector, the fitted line is that passing through the two centroids given by the means of top 50% and bottom 50%.

Such a centroid approach gives equal weight to all points and as a result there is less bias in the predicted values.

It will be understood that unlike some prior art techniques, a methodology implemented in accordance with the teaching of the invention does not exclude records with speeds at either site below a cut-off the present invention teaches that the cut-off is determined with regard to the reference site and that this is then used to determine the number of values in the test data set that should be excluded. By implementing a cut-off based on the reference site values, for example by use of the 'refCutoff' formula above it is possible to optimize the fitted line over the range of speeds of interest from the point of view of energy production. A turbine that is well-suited to its site will typically have a cutout speed in the region of half the site mean windspeed. Depending on the correlation relations established, half the mean speed at the prediction site will correspond roughly to half the mean speed at the reference site. However, at high-windspeed reference sites (of mean >8 m/s), speeds below half the mean can contribute to establishing the relations, while at low-windspeed reference sites, speeds above half the mean may be significantly affected by local winds (which may not be present at the prediction site). The above equation attempts to take some account of these factors.

For sectors with little data (of relevance mainly with short correlation periods), the fitting of a line of the form y=mx+b as described above could result in unrealistic slopes. This problem is avoided as follows (hourly data are assumed below; the numbers should be adjusted for ten-minute data).

If the number of filtered hours in a sector is at least the following, a line of the form y=mx+b is used.

$$\text{Critical number of hours} = 20 + (1 - R(s)) * 300,$$

where R(s) is the correlation coefficient between prediction and reference site speeds in this sector.

Otherwise, if there is a predetermined number of hours of data, for example, at least 5 filtered hours in a sector, a simple straight line through the origin and the centroid of filtered data (of the form 'y=mx') is used instead.

Otherwise, a line of slope 1 and intercept 0 is used.

An inspection of a chart of prediction-site against reference-site speed data and fitted line for each sector can be quite informative regarding both the wind characteristics at the sites and the speed correlation outputs.

When providing the long-term data format for examination of the potential resource at the test site a long-term time series is preferable to a frequency table with 1 m/s speed bins. In modifying the latter, if speeds are assumed to be uniformly distributed across these bins, this will lead to a slight positive bias in subsequent electricity production estimates (typically of the order of 0.1-0.2%). It will however be understood that since this bias is small in comparison to overall correlation uncertainty, the frequency table still represents a reasonable determination quanta for use in evaluating the electricity production.

It will be understood that what has been described herein are exemplary methodologies and apparatus for implementing such methodologies which are useful in providing wind forecasts for specific site on which the data set is limited. By providing a correlation with a site whose data is extended, it is possible to extrapolate the actual data gathered to represent future data measurements. In this way the future operating conditions of one or more turbines at a wind farm may be evaluated. As power output for a specific turbine is related to the conditions in which it is operating it is then possible to provide an estimate of wind farm electricity production values. While the invention has been described with reference to exemplary embodiments it will be understood that such embodiments are provided as illustrative of the teaching of the invention which is not to be limited in any fashion except as may be deemed necessary in the light of the appended claims.

It will be understood that while exemplary features of a system and methodology in accordance with the teaching of the invention have been described that such an arrangement is not to be construed as limiting the invention to such features. A method and apparatus for determining wind farm electricity production in accordance with the teaching of the invention can be implemented in software, firmware, hardware, or a combination thereof. In one mode, the method and apparatus for determining wind farm electricity production is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Therefore, the server or computer 130 as described with reference to FIG. 1 may be considered as representative of any computer(s) in which the method and apparatus for determining wind farm electricity production resides or partially resides.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor 140 is a hardware device for executing software, particularly software stored in memory. Processor 140 can be any custom made or commercially available processor, a central processing unit (CPU), an auxiliary processor among several processors associated with the computer 300, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. Processor 302 may also represent a distributed processing architecture such as, but not limited to, SQL, Smalltalk, APL, KLisp, Snobol, Developer 200, MUMPS/Magic.

Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor 140.

The software in memory 140 may include one or more separate programs. The separate programs comprise ordered listings of executable instructions for implementing logical functions. In the example of heretofore described, the software in memory includes the one or more components of the method and apparatus for determining wind farm electricity production and is executable on a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). Operating system essentially controls the execution of other computer programs, such as the that provided by the teaching of the invention, and provides scheduling, input-output control, file and data management, memory management, and communication control and related services.

An apparatus provided in accordance with the teaching of the invention may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching of the invention may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices and components of the computer may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

When the method for determining wind farm electricity production is implemented in software, for example processing the methodology provided in FIG. 3, it should be noted that such software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Any process descriptions or blocks in figures, such as FIG. 1 or 3, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The words comprises/comprising when used in this specification are to specify the presence of stated features, integers, steps or components but does not preclude the presence or addition of one or more other features, integers, steps, components or groups thereof.

The invention claimed is:

1. A method for determining wind farm electricity production, the method comprising the steps of:
   a. identifying a wind farm test site and a corresponding reference site for which historical meteorological data is available;
   b. collecting meteorological data sets representative of wind speed and direction for both of the test and reference site for a specific time period;
   c. sectorising the collected data sets for each of the reference and test site into two or more direction sectors representative of the wind direction comprising establishing a wind veer quanta representative of offsets in wind direction between wind data collected proximate in time at each of the test and reference sites;
   d. for each direction sector sorting the wind speeds within that sector into a ranked order so as to provide a sorted data set for each sector of each of the reference and test sites;
   e. establishing a relationship between the sorted data sets in corresponding test and reference site sectors;
   f. using the established relationship to provide an estimation of future meteorological conditions at the test site; and,
   g. using the estimation of future meteorological conditions at the test site to determine the electricity production for that site.

2. The method of claim 1 wherein the step of sorting the wind speeds includes establishing a cut off value for which wind speeds below a certain value are discarded in the subsequent establishment of the relationships.

3. The method of claim 2 wherein the step of establishing the cut off value is made with reference to the reference site only, the method including discarding, within the test site data, the same number of values as are discarded within the reference site data.

4. The method of claim 3 wherein the cut off value is a dynamic value generated as a result of the number of data set points within the reference data set.

5. The method of claim 1 wherein the step of establishment a wind veer quanta is effected on data set that has been reduced by discarding values below a determined cut off value.

6. The method of claim 5 wherein the cut off value is related to the operational performance of wind turbines which are to be used on the test site.

7. An apparatus for determining wind farm electricity production, the apparatus comprising:
   a. a first data store including data representative of wind speed and direction for a reference site, the reference site having meteorological data defined within a first time period;
   b. a second data store having data representative of wind speed and direction for at least one test site, at least one test site having meteorological data defined within a second time period, the second time period being less than the first time period;

c. computer logic configured to interface with both the first and second data stores to provide a sectorising of the data within each of the first and second data stores into two or more direction sectors representative of the wind direction;

d. computer logic configured to interface with the data within each direction sector to effect a sorting of the wind speeds within that sector into a ranked order so as to provide a sorted data set for each sector of each of the reference and test sites;

e. computer logic configured to establish a relationship between the sorted data sets in corresponding test and reference site sectors;

f. computer logic configured to use the established relationship to provide an estimation of future meteorological conditions at the test site;

g. computer logic configured to use the estimation of future meteorological conditions at the test site to determine the electricity production for that site; and h. computer logic configured to establish a wind veer quanta representative of offsets in wind direction between wind data collected proximate in time at each of the test and reference sites for each of the two or more direction sectors.

8. The apparatus of claim 7 wherein the computer logic configured to effect a sorting of the wind speeds includes logic configured to provide a cut off value for which wind speeds below a certain value are discarded in the subsequent establishment of the relationships.

9. The apparatus of claim 8 wherein the computer logic is configured to establish the cut off value with reference to the reference site only, the logic being further configured to effect a discard within the test site data of the same number of values as are discarded within the reference site data.

10. The apparatus of claim 8 wherein the cut off value is a dynamic value generated as a proportion of the number of data set points within the reference data set.

11. The apparatus of claim 7 wherein the computer logic configured to establish the wind veer quanta is operable on a data set that has been reduced by effecting a discard of values below a determined cut off value from within each of the reference and test data stores.

12. The apparatus of claim 11 wherein the computer logic utilizes a cut off value that is related to the operational performance of wind turbines which are to be used on the test site.

13. The apparatus of claim 7 wherein the reference data store is useable for plurality of test sites.

14. An apparatus configured to provide an estimate of electricity production from one or more test sites for which meteorological data is limited, the apparatus being configured to compare data collected from the one or more data test sites with data collected from a corresponding time period from a reference site, the comparison comprising sorting of wind speed data from each of the test sites and reference site into ranked data sets such that a wind frequency distributions for each of the test sites and reference site are established, the ranked data sets being separated into two or more direction sectors representative of the wind direction and comprising establishing a wind veer quanta representative of offsets in wind direction between wind data collected proximate in time at each of the test and reference sites, the apparatus being further configured to establish a relationship between data concurrently collected at each of the test and reference sites to provide an interrelationship between the respective sites and to use that interrelationship, in combination with historical data from the reference site, to provide an indication of future meteorological conditions at the one or more test sites, the future meteorological conditions being related to the potential electricity production from the respective test sites.

15. A computer program which when run on a computer is configured to carry out the following steps:

h. collect meteorological data sets representative of wind speed and direction for both of a test and reference site for a specific time period;

i. sectorise the collected data sets for each of the reference and test site into two or more direction sectors representative of the wind direction comprising establishing a wind veer quanta representative of offsets in wind direction between wind data collected at the same time at each of the test and reference sites;

j. for each direction sector sort the wind speeds within that sector into a ranked order so as to provide a sorted data set for each sector of each of the reference and test sites;

k. establish a relationship between the sorted data sets in corresponding test and reference site sectors;

l. use the established relationship to provide an estimation of future meteorological conditions at the test site; and, m. use the estimation of future meteorological conditions at the test site to determine the electricity production for that site.

* * * * *